United States Patent Office 2,854,479
Patented Sept. 30, 1958

2,854,479

FLUOROAROMATIC COMPOUNDS AND METHOD OF MAKING THE SAME

Edgar C. Britton and Theodore R. Keil, Midland, Mich., assignors to The Dow Chemical Company, Midland, Mich., a corporation of Delaware No Drawing. Application September 4, 1956
Serial No. 607,578

10 Claims. (Cl. 260—520)

This invention concerns certain new fluoroaromatic compounds and a method of making the same from aromatic diazonium fluoborates. It relates more particularly to a method and agents for carrying out the decomposition of an aromatic diazonium fluoborate to form a corresponding fluoroaromatic compound.

Balz and Schiemann, Berichte, vol. 60, page 1186 (1927), disclose that the thermal decomposition of an aromatic diazonium fluoborate yields the corresponding aromatic fluoride, with liberation of boron trifluoride and nitrogen. Considerable literature concerning this reaction has developed over the intervening years and the preparation of a great many aromatic fluorides by this method has now been reported. For example, Organic Synthesis, vol. XIII, pages 46–50, makes benzene fluoride by the thermal decomposition of benzene diazonium fluoborate, wherein the solid material is heated gently in a flask at one point near the surface with a small flame until decomposition begins. The flame is then withdrawn and the reaction allowed to continue spontaneously. Normally the reaction proceeds smoothly with intermittent heating. However, it is known that the presence of moisture affects the stability of benzene diazonium fluoborate. The moist product if allowed to stand packed together, may undergo spontaneous decomposition. Organic reactions, vol. V, page 211, discloses that aromatic diazonium fluoborates may be decomposed by suspending the salt in an indifferent solvent such as petroleum ether, toluene, biphenyl or quinoline and heating. Zenitz and Hartung, J. Org. Chem., vol. 11, page 448 (1946), make m-fluoropropiophenone by adding meta-propiophenone diazonium fluoborate to boiling toluene with stirring. Goldberg et al., J. A. C. S., vol. 69, page 262 (1947), make fluorophenanthrene by decomposing dry phenanthrene diazonium fluoborate in dry dioxane at refluxing temperature. Roe and Hawkins, J. A. C. S., vol. 69, pages 2443–4 (1947), make 3-fluoropyridine by suspending damp pyridine diazonium fluoborate in cold high boiling petroleum ether and maintaining the temperature between 15° and 25° C. where the reaction takes place slowly. J. Chem. Soc. (London), Suppl. 1, pages 95–99 (1949) describes the decomposition of 4-nitrotoluene-2-diazonium fluoborate in monochlorobenzene at a temperature of 116° C.

The reaction which occurs when an aromatic diazonium fluoborate decomposes to form a corresponding aromatic fluoride is illustrated by the equation, (1) $ArN_2BF_4 \rightarrow ArF + N_2 + BF_3$ wherein Ar is an aromatic radical.

The methods heretofore proposed for the carrying out of the decomposition of an aromatic diazonium fluoborate to yield a corresponding fluoroaromatic compound have certain disadvantages. The decomposition reaction is susceptible of undergoing an extremely vigorous or "runaway" exothermic reaction which is difficult to control, usually forms an appreciable amount of tar, and large volumes of gaseous byproducts including toxic boron trifluoride are evolved from the reaction.

It is an object of the invention to provide an improved method for carrying out the decomposition of an aromatic diazonium fluoborate to form a corresponding fluoroaromatic compound. Another object is to provide a method and agents for immobilizing the toxic by-product boron trifluoride evolved in the decomposition of an aromatic diazonium fluoborate. Still another object is to provide improvements in a process for carrying out the decomposition of an aromatic diazonium fluoborate to form a corresponding aromatic fluoride in an inert liquid reaction medium. A further object is to provide a process for carrying out the decomposition of an aromatic diazonium fluoborate in a liquid medium wherein the boron trifluoride formed in the reaction is converted to a stable solid form readily separable from the liquid. Other and related objects may appear from the following description of the invention.

According to the invention the foregoing and related objects are obtained by carrying out the decomposition of an aromatic diazonium fluoborate in an inert liquid organic compound as reaction medium and in the presence of an alkali metal fluoride or acid salt thereof in amount at least chemically equivalent to combine with the boron trifluoride evolved in the reaction. The reactions which occur in the process according to the invention employing an alkali metal fluoride or an acid salt thereof, e. g., sodium fluoride, sodium hydrogen fluoride or potassium fluoride, in the reaction are illustrated by the equations, (2) $ArN_2BF_4 + NaF \rightarrow ArF + NaBF_4 + N_2$ (3) $2ArN_2BF_4 + NaHF_2 \rightarrow 2ArF + NaBF_4 + HBF_4 + 2N_2$ wherein Ar is an aromatic radical. The Equations 2 and 3 illustrate the way in which the boron trifluoride, evolved in the decomposition reaction illustrated by Equation 1 above, is immobilized or chemically combined with the alkali metal fluoride and is prevented from escaping from the reaction in practice of the invention.

Surprisingly, it has been found that the boron trifluoride liberated in the decomposition reaction, and usually evolved as a gas, readily reacts with an alkali metal fluoride or an alkali metal hydrogen fluoride suspended in the reaction mixture to form an alkali metal fluoborate without escaping from the reaction mixture. It has further been found that the presence of an alkali metal fluoride in the reaction mixture inhibits or substantially prevents the formation of tar or tarry by-products in the decomposition reaction.

By carrying out the decomposition of an aromatic diazonium fluoborate in an inert organic liquid which is a solvent for the fluoroaromatic compound formed in the reaction and in the presence of an alkali metal fluoride as herein defined, only nitrogen gas is evolved from the reaction mixture. The reaction products are obtained in a form readily separable from one another. The solid alkali metal fluoborate or alkali metal fluoborate and alkali metal fluoride, when an excess of the latter is used, can readily be separated from the liquid in usual ways, e. g. by filtering or decanting. The fluoroaromatic compound is recovered from the liquid solvent in usual ways such as by distillation or crystallization.

Any alkali metal fluoride or alkali metal acid fluoride such as sodium fluoride, potassium fluoride, lithium fluoride, acid sodium fluoride, acid potassium fluoride or acid lithium fluoride can be employed in the process. The alkali metal fluoride or an acid salt is employed in amount at least sufficient to chemically combine with the boron trifluoride evolved in the decomposition of the aromatic diazonium fluoborate, and is preferably employed in amounts corresponding to from 1.1 to 2 stoichiometric proportions of the alkali metal fluoride per part of the boron trifluoride, although larger proportions can be used.

The decomposition of the aromatic diazonium fluoborate is carried out while having the diazonium compound dissolved or suspended in an inert liquid organic compound as reaction medium and in admixture with an alkali metal fluoride or an acid salt thereof also dissolved or suspended in said liquid reaction medium. Any non-reactive organic compound which is a liquid under the conditions employed, and is a solvent for the fluoroaromatic compound formed by the reaction can be used in the process. The organic reaction medium is preferably an organic compound which is a liquid at atmospheric pressure at the temperatures employed. Examples of suitable organic compounds are aliphatic and aromatic compounds such as heptane, octane, benzene, toluene, xylene, chlorobenzene, ortho-dichlorobenzene, 1,2,4-trichlorobenzene, tetra-chlorobenzene, ethylbenzene, diethylbenzene, isopropylbenzene, phenetole, ethylene dichloride, trichloroethane, etc. The organic compounds are suitably liquid aromatic hydrocarbons or nuclear chlorinated derivatives thereof, preferably chlorinated benzenes such as o-dichlorobenzene, trichlorobenzene, etc. The organic liquid can be used in any desired amount, but is usually employed in an amount sufficient to form with the aromatic diazonium fluoborate starting material, a mixture or slurry which can conveniently be stirred.

The decomposition of the aromatic diazonium fluoborate can be carried out at subatmospheric, atmospheric or superatmospheric pressure, but is usually carried out at atmospheric pressure or thereabout and at temperatures which are dependent in part upon the decomposition temperature of the aromatic diazonium fluoborate employed. The decomposition reaction is carried out under anhydrous or substantially anhydrous conditions.

The process can be carried out batchwise or in continuous manner. For example, the ingredients, i. e., the aromatic diazonium fluoborate starting material and the alkali metal fluoride or an acid salt thereof, can be suspended in a suitable inert liquid organic compound, e. g. trichlorobenzene, as reaction medium in the desired proportions and the mixture heated to effect decomposition of the diazonium fluoborate. The product is recovered from the reacted mixture in usual ways.

In a preferred practice, the aromatic diazonium fluoborate starting material is suspended in an inert liquid organic compound such as trichlorobenzene to form a slurry or feed solution. This solution is fed into admixture with a suspension of an alkali metal fluoride, e. g., sodium fluoride, in the organic compound used as the reaction medium. The resulting mixture is agitated, e. g. by stirring, and maintained at temperatures which allow the decomposition reaction to proceed smoothly. The slurry is fed at about the rate that the aromatic diazonium fluoborate is consumed in the reaction. Upon completion of the reaction, the reaction mixture is usually filtered to separate the solid alkali metal fluoborate material from the liquid. The aromatic fluoride product is recovered from the liquid in the usual ways, e. g. by distillation or crystallization.

The following examples illustrates ways in which the principle of the invention has been applied, but are not to be construed as limiting its scope.

*Example 1*

To a glass reaction vessel equipped with a reflux condenser and stirrer there was added 125 cc. of 1,2,4-trichlorobenzene and 24.8 grams (0.4 mole) of sodium acid fluoride (NaHF$_2$). The mixture was stirred and heated to a temperature of 100° C. Thereafter, a mixture of 38.4 grams (0.2 mole) of benzene diazonium fluoborate suspended in 125 cc. of 1,2,4-trichlorobenzene was added in small portions over a period of 15 minutes while stirring and maintaining the resulting mixture at temperatures between 96° and 100° C. The mixture was then heated to a temperature of 125° C. over a period of 5 minutes and cooled to 25° C. Nitrogen evolved in the decomposition reaction was vented through the reflux condenser. The vent gas contained no boron trifluoride. The reaction product was filtered to separate the solid material from the liquid. The filter cake was washed with benzene and the washings added to the filtrate. The cake was dried and analyzed. It consisted of 12.4 grams of NaHF$_2$ and 22.0 grams of NaBF$_4$ by analysis. The filtrate was washed with 50 cc. of water, then with 60 cc. of 15 percent sodium hydroxide solution, was dried and fractionally distilled to recover the product. There was obtained 15.1 grams (0.157 mole) of fluorobenzene boiling at temperatures between 82° and 92° C. as a colorless liquid having a refractive index $n_D^{23}$ 1.4646. The yield of said product was 78.5 percent based on the benzene diazonium fluoborate initially used.

*Example 2*

A mixture of 200 cc. of 1,2,4-trichlorobenzene and 28.2 grams (0.67 mole) of sodium fluoride was placed in a reaction flask equipped with a reflux condenser and stirrer. The mixture was stirred and heated to a temperature of 140° C. Thereafter, a mixture consisting of 316 grams (1.34 moles) of paraethoxybenzene diazonium fluoborate and 56.2 grams (1.34 moles) of sodium fluoride suspended in 790 cc. of 1,2,4-trichlorobenzene was added gradually over a period of 48 minutes while stirring and heating the resulting mixture at temperatures between 140° and 145° C. The mixture was stirred for 5 minutes longer then cooled to 40° C. The diazonium fluoborate decomposed smoothly. Nitrogen evolved in the reaction was vented through the reflux condenser. No boron trifluoride was vented from the reaction. The reaction product was filtered. The filter cake was washed with benzene and the washings added to the filtrate. The cake was dried. It contained 149 grams of sodium fluoborate by analysis. The filtrate was washed two times, each with a 200 cc. portion of an aqueous 15 percent sodium hydroxide solution, then was fractionally distilled. There was obtained 124.5 grams (0.89 mole) of para-fluorophenetole as a colorless liquid boiling at 91°–93° C. at 50 millimeters absolute pressure and having a refractive index $n_D^{25}$ 1.4808. The yield of said product was 59.3 percent based on the paraethoxybenzene diazonium fluoborate initially used.

*Example 3*

A mixture consisting of 209 grams (0.94 mole) of para-methoxybenzene diazonium fluoborate and 39.6 grams of sodium fluoride suspended in 525 cc. of 1,2,4-trichlorobenzene was added to a mixture of 9.9 grams (0.236 mole) of sodium fluoride suspended in 200 cc. of 1,2,4-trichlorobenzene with stirring over a period of 33 minutes while heating the resulting mixture at temperatures between 145° and 150° C. The decomposition reaction was carried out and the products recovered employing procedures similar to those employed in Example 2. No boron trifluoride was vented from the reaction. There was obtained 86.3 grams (0.683 mole) of para-fluoroanisole as a colorless liquid boiling at 94°–95.5° C. at 100 millimeters and having a refractive index $n_D^{25}$ 1.4859. The yield of said product was 68.5 percent based on the para-methoxybenzene diazonium fluoborate initially used.

*Example 4*

A charge of 26.6 grams (0.1 mole) of para-(carboxymethoxy) benzene diazonium fluoborate was suspended in 150 cc. of 1,2,4-trichlorobenzene. The slurry was added with stirring to a mixture of 125 cc. of 1,2,3-trichlorobenzene and 6.3 (0.15 mole) of sodium fluoride over a period of 10 minutes while maintaining the resulting mixture at temperatures between 160° and 165° C. in a glass reaction vessel equipped with a reflux condenser. Nitrogen evolved in the reaction was vented. The vent gases contained a trace of boron trifluoride by analysis. The reaction product was cooled to 75° C. and filtered to separate the solid material from the liquid. The filtrate was heated to distill the 1,2,4-trichlorobenzene. Heating was continued until the material in the still pot was at a temperature of 130° C. at 3 millimeters' absolute pressure. The residue was cooled. It was a crystalline material. It was recrystallized from ethylcyclohexane, then from water and dried. There was obtained 8 grams (0.047 mole) of para-fluorophenoxyacetic acid melting at 89.5–97.5° C. Similar results were obtained when employing phenetole as the reaction medium, instead of the 1,2,4-trichlorobenzene.

*Example 5*

(A) A charge of 28 grams (0.1 mole) of 5-amino-2-biphenylyloxyacetic acid, hydrochloride was suspended in an aqueous 4.5 weight percent solution of hydrochloric acid containing 0.16 mole of the HCl. The mixture was stirred and cooled to 0° C. A solution of 15 cc. of water containing 6.9 grams (0.1 mole) of sodium nitrite was added with stirring over a period of 13 minutes while maintaining the resulting mixture at temperatures between 0° and 3° C. Thereafter, a solution of 13.2 grams (0.12 mole) of sodium fluoborate in 20 cc. of water was added. Stirring and cooling of the mixture at temperatures between 0° and 6° C. was continued for about 15 minutes. A solid precipitate was obtained. It was separated by filtering and dried under reduced pressure at a temperature of 25° C. There was obtained 34 grams (0.1 mole) of 2-(carboxymethoxy)-5-biphenyldiazonium fluoborate.

(B) A charge of 33.5 grams of the 2-(carboxymethoxy)-5-biphenyldiazonium fluoborate obtained in part A above was suspended in 150 cc. of 1,2,4-trichlorobenzene, together with 2.3 grams of sodium fluoride. The mixture was added in small portions with stirring to a mixture of 2.3 grams of sodium fluoride suspended in 125 cc. of 1,2,4-trichlorobenzene over a period of 16 minutes while maintaining the temperature of the reaction mixture at temperatures between 150° and 155° C. Stirring was continued for 3 minutes longer, after which the reaction mixture was allowed to cool to 70° C. Nitrogen evolved in the reaction was vented through a reflux condenser. No boron trifluoride was found in the vent gases. Upon cooling, the liquid trichlorobenzene solution was decanted from the solid sodium fluoborate and unreacted sodium fluoride residue. The solution was warmed to 60° C., treated with activated charcoal and filtered. A clear yellow solution was obtained. The trichlorobenzene was evaporated under reduced pressure until a residue of about 30 cc. volume was obtained. This residue was mixed with 100 cc. of water, stirred vigorously and made alkaline by adding 8.5 grams of sodium bicarbonate in small portions. The aqueous solution was made acidic by adding a small amount of a concentrated aqueous hydrochloric acid solution thereto. A brown viscous oil separated. The oil was washed with water and dried in a vacuum oven at a temperature of 60° C. There was obtained 14 grams of 5-fluoro-2-biphenylyloxyacetic acid as a brown resin. The product was analyzed and found to contain:

|  | C | F |
|---|---|---|
| Found | 67.7 | 7.4 |
| Calculated | 68.14 | 7.4 |

The 5-fluoro-2-biphenylyloxyacetic acid is a new compound having the formula

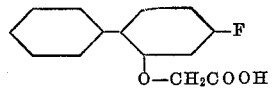

The compound is useful as the active ingredient in the preparation of agricultural sprays for the control of insects, e. g. the control of 2-spotted spider mites.

*Example 6*

A charge of 30.2 grams (0.1 mole) of a 4-(carboxymethoxy)-2,5-xylenediazonium fluoborate was prepared by procedure similar to that employed in part A of Example 5. The 4-(carboxymethoxy)-2,5-xylenediazonium fluoborate is decomposed by suspending the same in 150 cc. of 1,2,4-trichlorobenzene and adding the suspension in small portions to a mixture of 125 cc. of 1,2,4-trichlorobenzene containing 10 grams of sodium fluoride maintained at temperatures between 155° and 160° C. over a period of about 20 minutes. The reaction mixture is cooled and filtered to remove the solids. The filtrate is concentrated to about 50 cc. volume by distilling off a portion of the trichlorobenzene under reduced pressure. The residue is cooled to 25° C. and the crystalline product separated by filtering, washed and dried. The product can be purified by recrystallization from a solvent such as ethylcyclohexane or water. The 4-fluoro-2,5-xylyloxyacetic acid thus obtained is a white crystalline product melting at 114.6–115.3° C. The product is a new compound having the formula

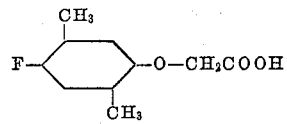

The compound 4-fluoro-2,5-xylyloxyacetic acid melting at 114.6° to 115.3° C. was prepared by procedure similar to that described above and was found to contain by analysis:

|  | C, Percent | F, Percent |
|---|---|---|
| Found | 61.24 | 8.8 |
| Calculated | 60.6 | 9.6 |

The compound 4-fluoro-2,5-xyloxyacetic acid has been found to be useful as the active ingredient in the preparation of aqueous spray compositions for the control of plants e. g. weeds such as the mustard species.

*Example 7*

(A) A purpose of this example is to illustrate a utility for the new compounds 5-fluoro-2-biphenylyloxyacetic acid and 4-fluoro-2,5-xylyloxyacetic acid prepared in Examples 5 and 6, respectively.

An aqueous spray composition was prepared by suspending powdered 5-fluoro-2-biphenylyloxyacetic acid in an aqueous solution containing alkylaryl sodium sulfonate wetting agent in amount corresponding to 0.5 pound per 100 gallons of water and the 5-fluoro-2-biphenylyloxyacetic acid in amount corresponding to 2 pounds of said compound per 100 gallons of the aqueous solution. Bean plants heavily infested with 2-spotted spider mites (*Tetranychus bimaculatus*) were dipped in the aqueous suspension, then maintained in a greenhouse and observed 108 hours later for percent kill of the insects. The compound 5-fluoro-2-biphenylyloxyacetic acid was effective in killing 95 percent of the 2-spotted spider mites.

For the purpose of comparison, bean plants heavily infested with 2-spotted spider mites were dipped in an aqueous solution containing the alkylaryl sodium sulfonate alone in amount corresponding to that employed in making the spray composition with the 5-fluoro-2-biphenylyloxyacetic acid. The solution of the wetting agent alone was ineffective to kill the 2-spotted spider mites.

(B) A water-wettable powder formulation was prepared by mixing 25 parts by weight of powdered 4-fluoro-2,5-xylyloxyacetic acid with 75 parts of powdered alkyl-aryl sodium sulfonate wetting agent. The mixture was dispersed in water to form an aqueous spray composition containing 4 parts by weight of the powder formulation per 1000 parts of the water. Radish seeds (*Raphanus sativus*) were planted in a test plot of soil. The soil was sprayed with the aqueous composition in amount corresponding to 12.5 pounds of the spray composition per acre. After three weeks the soil and seeds were observed for emergence and germination. No germination of the radish seeds occurred.

In contrast, radish seeds planted in soil which was not sprayed with the solution had attained a growth of about three inches in the same period of time.

We claim:

1. In a process wherein an aromatic diazonium fluoborate is decomposed to form a corresponding fluoroaromatic compound while having the diazonium fluoborate dispersed in a substantially anhydrous inert liquid organic compound as reaction medium, the step which consists in carrying out the decomposition reaction in the presence of an inorganic fluoride selected from the group consisting of alkali metal fluorides and alkali metal acid fluorides, in amount corresponding to from 1 to 2 stoichiometric proportions of the inorganic fluoride per part of the boron trifluoride theoretically possible to be evolved in the reaction, based on the aromatic diazonium fluoborate used.

2. A method of making a fluoroaromatic compound which comprises decomposing an aromatic diazonium fluoborate while dispersed in a substantially anhydrous inert liquid organic compound as reaction medium and in admixture with an inorganic fluoride selected from the group consisting of alkali metal fluorides and alkali metal acid fluorides, in amount corresponding to from 1 to 2 stoichiometric proportions of the inorganic fluoride per part of the boron trifluoride theoretically possible to be evolved in the reaction, based on the aromatic diazonium fluoborate used.

3. A method as claimed in claim 2, wherein the inorganic fluoride is sodium fluoride.

4. A method as claimed in claim 2, wherein the inorganic fluoride is sodium acid fluoride.

5. A method as claimed in claim 2, wherein the liquid reaction medium is a nuclear chlorinated aromatic hydrocarbon.

6. A method as claimed in claim 5, wherein the liquid reaction medium is a nuclear chlorinated benzene.

7. A method as claimed in claim 6, wherein the liquid reaction medium is 1,2,4-trichlorobenzene.

8. A process for making 5-fluoro-2-biphenylyloxy acetic acid which comprises decomposing 2-(carboxymethoxy)-5-biphenyl-diazonium fluoborate while dispersed in liquid 1,2,4-trichlorobenzene in admixture with sodium fluoride in amount corresponding to from 1 to 2 stoichiometric proportions of the sodium fluoride per part of the boron trifluoride theoretically possible to be evolved in the reaction, based on the 2-(carboxymethoxy)-5-biphenyldiazonium fluoborate initially used.

9. 5 - fluoro - 2 - biphenylyloxyacetic acid having the formula

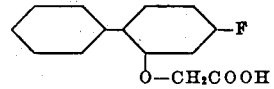

10. 4-fluoro-2,5-xylyloxyacetic acid having the formula

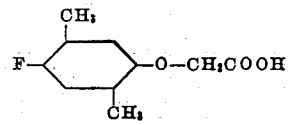

References Cited in the file of this patent

Balz et al.: Chem. Absts. 21, p. 2668 (1927).
Roe et al.: J. A. C. S. 69, pp. 2443–4 (1947).
Saunders: The Aromatic Diazo-Compounds and Their Technical Applications, pp. 283–4 (1949).
Berhenke et al.: J. A. C. S. 73, p. 4458 (1951).
Muir et al.: Chem. Absts. 47, p. 9435 (1953).
Weintraub: Chem. Absts. 48, p. 14083 (1954).